United States Patent
Villemin et al.

(10) Patent No.: US 10,801,083 B2
(45) Date of Patent: Oct. 13, 2020

(54) METHOD FOR MELTING METAL MATERIAL IN A MELTING PLANT AND RELATIVE MELTING PLANT

(71) Applicant: DANIELI & C. OFFICINE MECCANICHE SPA, Buttrio (IT)

(72) Inventors: Bernard Villemin, Eggenwil (CH); Uwe Wilhelm, Willstätt (DE); Thomas Narholz, Feldmeilen (CH); Enrico Riga, Udine (IT)

(73) Assignee: DANIELI & C. OFFICINE MECCANICHE SPA, Buttrio (IT)

( * ) Notice: Subject to any disclaimer, the term of this patent is extended or adjusted under 35 U.S.C. 154(b) by 901 days.

(21) Appl. No.: 14/786,152

(22) PCT Filed: Apr. 23, 2014

(86) PCT No.: PCT/IB2014/060942
§ 371 (c)(1),
(2) Date: Oct. 21, 2015

(87) PCT Pub. No.: WO2014/174463
PCT Pub. Date: Oct. 30, 2014

(65) Prior Publication Data
US 2016/0076114 A1    Mar. 17, 2016

(30) Foreign Application Priority Data

Apr. 23, 2013 (IT) .............................. UD2013A0052

(51) Int. Cl.
C21C 5/52 (2006.01)
C21C 5/56 (2006.01)
(Continued)

(52) U.S. Cl.
CPC .............. C21C 5/52 (2013.01); C21C 5/527 (2013.01); C21C 5/565 (2013.01); F27B 3/085 (2013.01);
(Continued)

(58) Field of Classification Search
None
See application file for complete search history.

(56) References Cited

U.S. PATENT DOCUMENTS 5,513,206 A  4/1996 Mori et al.
5,654,976 A * 8/1997 Cowx ................. C21C 5/5264
373/79

(Continued)

FOREIGN PATENT DOCUMENTS

JP   2012092435   * 9/2010
WO  WO-03/095685 A1  11/2003

OTHER PUBLICATIONS

Mathy et al., "New Means for Controlling the Scrap Mix Charged in the EAF and Its Melting Progress", Revue De Metallurgie—Cahiers D'Informations Techniques, Revue De Metallurgie, Paris, France, vol. 99, No. 6, Jun. 1, 2002.

(Continued)

*Primary Examiner* — Sheng H Davis
(74) *Attorney, Agent, or Firm* — Marshall, Gerstein & Borun LLP

(57) ABSTRACT

Method for melting metal material in a melting plant comprising at least an electric furnace having at least a shell into which said metal material is introduced, and feed means to (Continued)

load said metal material into said shell, said method comprising at least a step of loading said metal material into said shell by means of said feed means, a melting step in which said metal material is melted, and a subsequent tapping step in which the molten metal material is tapped.

16 Claims, 4 Drawing Sheets

(51) Int. Cl.
    *F27B 3/08*     (2006.01)
    *F27B 3/18*     (2006.01)
    *F27B 3/20*     (2006.01)
    *F27D 3/00*     (2006.01)
    *F27D 11/10*     (2006.01)
    *F27D 13/00*     (2006.01)

(52) U.S. Cl.
    CPC ............... *F27B 3/18* (2013.01); *F27B 3/183* (2013.01); *F27B 3/186* (2013.01); *F27B 3/205* (2013.01); *F27D 3/0024* (2013.01); *F27D 3/0025* (2013.01); *F27D 11/10* (2013.01); *F27D 13/002* (2013.01); *F27D 2003/0038* (2013.01); *F27M 2002/11* (2013.01); *Y02P 10/216* (2015.11)

(56) References Cited

U.S. PATENT DOCUMENTS

| | | | | |
|---|---|---|---|---|
| 5,802,097 | A | * | 9/1998 | Gensini ............ C21C 5/5217 266/47 |
| 6,024,912 | A | | 2/2000 | Wunsche |
| 6,155,333 | A | | 12/2000 | Vallomy |
| 6,693,948 | B2 | | 2/2004 | Mizukami et al. |
| 2002/0005083 | A1 | | 1/2002 | Dimitrov et al. |
| 2008/0267250 | A1 | * | 10/2008 | Argenta ............ C21C 5/527 373/80 |

OTHER PUBLICATIONS

Search Report and Written Opinion for PCT/IB2014/060942, dated Nov. 17, 2014.
International Preliminary Report on Patentability for PCT/IB2014/060942, dated Jul. 29, 2015.

* cited by examiner fig. 1 (state of the art)

METHOD FOR MELTING METAL MATERIAL IN A MELTING PLANT AND RELATIVE MELTING PLANT

FIELD OF THE INVENTION

The present invention concerns a method for melting metal material in a melting plant which comprises means to feed a metal charge, for example scrap, and non-ferrous material, to an electric arc melting furnace. The invention also concerns the melting plant adopting the method.

The present invention is applied in processes for melting metal charge with a substantially continuous loading.

BACKGROUND OF THE INVENTION

Plants for the melting of metal material are known, of the continuous loading type, which comprise an electric arc furnace associated with means to feed the metal charge, which provide to feed the latter through a lateral opening made in the wall or casing of the electric furnace.

The electric furnace comprises at least a container, or shell, in which the lateral opening is normally made, and a covering roof. The electrodes are positioned and/or introduced through holes in the roof.

The continuous feed means can be the vibrating type to allow the load to advance, and cooperate on one side with the electric furnace and on the other side with a scrap-loading system.

The feed means can also be associated with translation means, which translate the feed means to position them in different positions inside the furnace, for example to allow an equal, regular and uniform distribution of the metal charge inside the furnace. In particular, solutions are known in which the end of the feed mean is positioned flush with the inner wall of the furnace, for example during the continuous loading of the scrap, and distanced from it, for example during the tapping step, when the furnace is inclined so as to tap the liquid metal, to prevent problems of reciprocal interference.

It is also known that, in order to carry out the first start-up loading with the furnace off, solutions of the continuous loading type normally use a loading system using baskets, in order to create on the bottom of the furnace a mass of metal material to be melted at start-of-cycle. When this mass has been completely melted, the feed means are positioned and the continuous process of loading the scrap into the furnace is started. Normally the quantity of material introduced with the basket is that necessary to define the so-called "hot heel", that is, the quantity of liquid metal that is always kept inside the container or shell also after tapping.

It is known that, in conventional processes with continuous loading, the quantity of material that defines the hot heel is about 50% of the liquid metal contained inside the furnace before tapping. Although this allows to start the melting step quickly after tapping, it is disadvantageous in terms of the extensive wear on the refractory that lines the inner walls of the furnace.

It is known that the time between one casting and the next is called "tap-to-tap". In the tap-to-tap time, steps are provided in which electric power is supplied, hereafter identified as a "power-on" condition, and non-operating steps, in which no electric power is supplied, indicated as "power-off". These steps are correlated to the modes of unloading the material into the furnace.

The quantity of metal charge inside the furnace is normally correlated to the degree of melting of the scrap inside the electric furnace.

In particular, as shown in the graph in FIG. 1, relating to methods traditionally used in the state of the art, the quantity of solid mass loaded is made substantially equal to the quantity of solid material that is melted. In this way, inside the liquid mass there is only a small part of solid mass that is melted on each occasion.

The bath of molten steel is kept at a temperature equal to or more than 1560° C.

Before the tapping step, the bath of molten steel is taken to a temperature comprised between 1600° C. and 1650° C. to allow the subsequent tapping operation. The molten steel at these temperatures has high reactivity, due to the high concentration of oxygen in it, and high turbulence due to the high convective motions that take place inside it.

These two parameters determine great wear on the refractory walls of the electric furnace, and this entails a need for frequent maintenance interventions and short duration of the lining The reduction in reactivity of the molten steel, that is, its deoxidation, is obtained by means of "killing" methods, which provide to add reaction substances inside the bath of steel which react with the oxygen.

The introduction of reaction substances inside the bath of steel requires a determinate reaction time so that the chemical reactions are completed. During this time interval, there is an advance in the process of erosion and corrosion of the refractory walls of the furnace.

The high temperature at which the liquid steel is maintained allows to promote the advance of the chemical reactions exponentially, but has the disadvantage that there is a considerable increase in the deterioration of the refractory covering the furnace.

It is also known to use auxiliary energy supply means, such as for example combustible gas burners, which are disposed on the walls of the furnace and which provide to heat the load of scrap introduced into the furnace.

The energy supply means can also be suitably disposed to generate an injection of oxygen at high speed, which penetrates through the layer of slag and into the molten metal, and increases the supply of heat energy to the bath thanks to the exothermic oxidation reactions of the alloy elements of the iron.

The energy supply means must however be disposed at a determinate distance from the metal bath in order to preserve their integrity with respect to deteriorating agents such as the very high temperature, the splashes of slag and/or molten metal. This means that they lose efficiency.

Furthermore, the flame of the energy supply means has a very low yield when they are associated with a functioning process with a flat bath. Moreover, the interaction of the flame, which is highly turbulent, with the surface of the bath protected by slag, can alter the correct metallurgic practice during melting.

U.S. Pat. No. 5,654,976 A discloses a method for melting ferrous scrap metal in a submerged arc furnace. In the technology with a submerged arc, the arc strikes between the electrode and the bath, and not between the electrode and the metal charge, as happens in the furnaces above discussed. Moreover, the furnaces with a submerged arc are only used to obtain oxides or iron alloys, and not steel. Moreover, U.S. Pat. No. 5,654,976 A does not provide any arrangement to reduce the wear of the refractory that, in any case, requires a completely different approach since, as we said before, the technology that uses a submerged arc needs completely different requirements than the technology of the "uncovered" arc.

U.S. Pat. No. 6,693,948 B2 discloses an apparatus and a method for arc-melting cold iron source which provides to maintain an amount of charge in the furnace and in the pre-heating shaft even after the tapping of the melted steel. However, the solution disclosed in this document has the disadvantage that an amount of cold charge made of scrap is maintained also during the tapping of the liquid steel; this has the shortcoming to contaminate the liquid steel with the scrap and does not allow to perform a careful metallurgical control of the melted product.

One purpose of the present invention is to perfect a method and obtain a corresponding plant for melting metal material that is efficient and that allows to optimize and reduce the electric power required for melting.

Another purpose of the present invention is to reduce the losses of heat energy from the bath of molten metal.

Another purpose of the present invention is to reduce the effects of wear on the walls of the electric furnace and therefore the maintenance interventions thereon, with the advantage of improving the overall productivity of the plant.

Another purpose of the present invention is to allow to use alternative and auxiliary forms of power other than electric, with high efficiency.

The Applicant has devised, tested and embodied the present invention to overcome the shortcomings of the state of the art and to obtain these and other purposes and advantages.

SUMMARY OF THE INVENTION

The present invention is set forth and characterized in the independent claims, while the dependent claims describe other characteristics of the invention or variants to the main inventive idea.

In accordance with the above purposes, a method for melting metal material according to the present invention is performed in a melting plant that comprises at least an electric furnace having a container or shell into which the metal material is introduced, for example scrap of various sizes, and feed means to load, possibly continuously, the metal material into the shell.

The method comprises at least a loading step, possibly continuous, of the metal material into the shell by means of the feed means, a melting step in which the metal material is melted, and a subsequent tapping step in which the metal material is tapped.

According to a characteristic feature of the present invention, during the melting step at least a first substep is provided, in which the metal material is loaded inside the shell with a big load in terms of mass over the unit of time, so as to generate a correspondingly big accumulation of solid material inside the shell, and at least a subsequent second substep in which the quantity of metal material unloaded into the shell is regulated so as to maintain, inside the liquid bath that is gradually formed, a quantity of solid mass substantially equal to the quantity of metal material that defines said accumulation.

In particular, the feed means are governed by a control device that is suitable to regulate the quantity of metal material loaded.

In this way, inside and/or mixed with the metal material that is melted on each occasion, there is a determinate and desired quantity of solid material that keeps the temperature of the liquid at a temperature lower than that in conventional methods, such as to limit phenomena of instability of the molten metal due to convective movements. This allows to reduce considerably the wear on the walls of the shell, with a consequent reduction in the frequency of maintenance operations in order to restore them.

Furthermore, containing the temperature of the molten metal also allows to perform a killing action on the steel which reduces its reactivity. In this way it is possible to further reduce the wear on the walls of the shell, and also to improve the quality of steel obtained.

According to another feature, the quantity of solid metal material that defines the accumulation is comprised between 25% and 45% of the overall quantity of molten material tapped.

In an advantageous variant, the quantity of solid metal material that defines the accumulation is comprised between 30% and 40%, preferably between 32% and 38%.

According to another feature, the feed means are disposed at the side and above the shell, and the metal material that defines the accumulation is disposed at a height near the feed height of the feed means. In particular, the feed means can comprise a conveyor, possibly associated with vibration means which, by means of positioning means, is disposed in proximity to one edge of the shell for loading the metal charge.

In the shell, an accumulation is defined that protrudes with respect to the level of material that is melted on each occasion.

According to another feature, when a maximum load condition of the melting shell is reached, a third substep is provided during which the feed load is reduced until it is canceled, namely the loading process is stopped, to allow all the metal material present in the furnace to be completely melted.

The process of tapping takes place only when the whole solid mass has melted, so as to ensure an excellent metallurgical control of the steel, ensuring the absence of contamination by solid scrap.

The method also provides that, during the tapping step of the molten material from the shell, a determinate level of molten material is left, also known as the hot heel, which makes it possible to quickly restart a subsequent melting step.

The level of the hot heel, unlike what normally happens in the state of the art, is substantially halved, and in particular is comprised between 10% and 25% of the molten material present in the shell before the tapping step. This allows to increase the overall productivity of the plant.

According to a variant embodiment, at least between and/or during the first and the second substep a contribution of auxiliary heat energy is provided, by means of heating means of the combustion type, such as for example gas burners. In this way it is possible to further increase the heat energy for melting the metal material.

According to another variant embodiment, the energy supply means are disposed in proximity with the accumulation of solid material to increase the temperature of the metal material just unloaded into the furnace. The particular disposition allows to direct the flame of the energy supply means and put it into direct contact with the accumulation of metal material so as to provide an efficient heating thereof. Furthermore, the accumulation of metal material functions as a barrier against possible splashes and against the high temperatures of the molten material that could affect the energy supply means. This allows to increase the working life and reduce the maintenance interventions on the energy supply means.

The present invention also concerns a plant that performs the method for melting metal material as described above.

BRIEF DESCRIPTION OF THE DRAWINGS

These and other characteristics of the present invention will become apparent from the following description of a preferential form of embodiment, given as a non-restrictive example with reference to the attached drawings wherein.

To facilitate comprehension, the same reference numbers have been used, where possible, to identify identical common elements in the drawings.

DETAILED DESCRIPTION OF A PREFERENTIAL FORM OF EMBODIMENT

Figure 3:
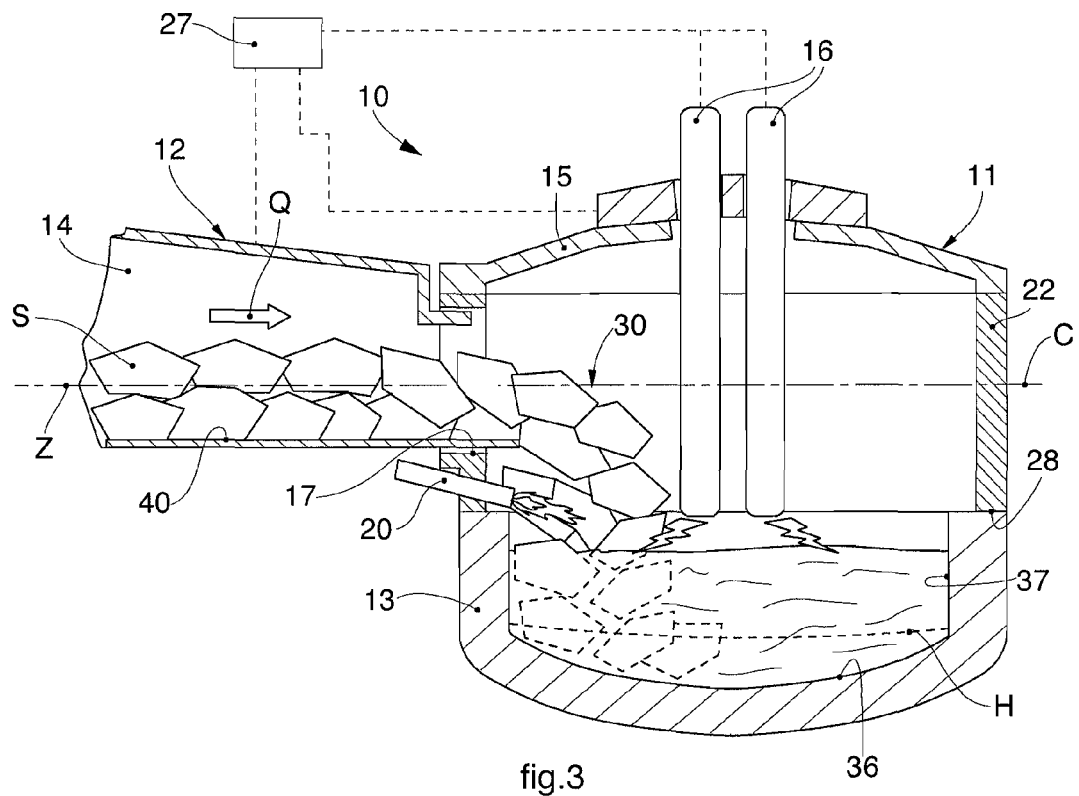
FIG. 3 is a schematic representation in section of a melting plant.
Figure 4:
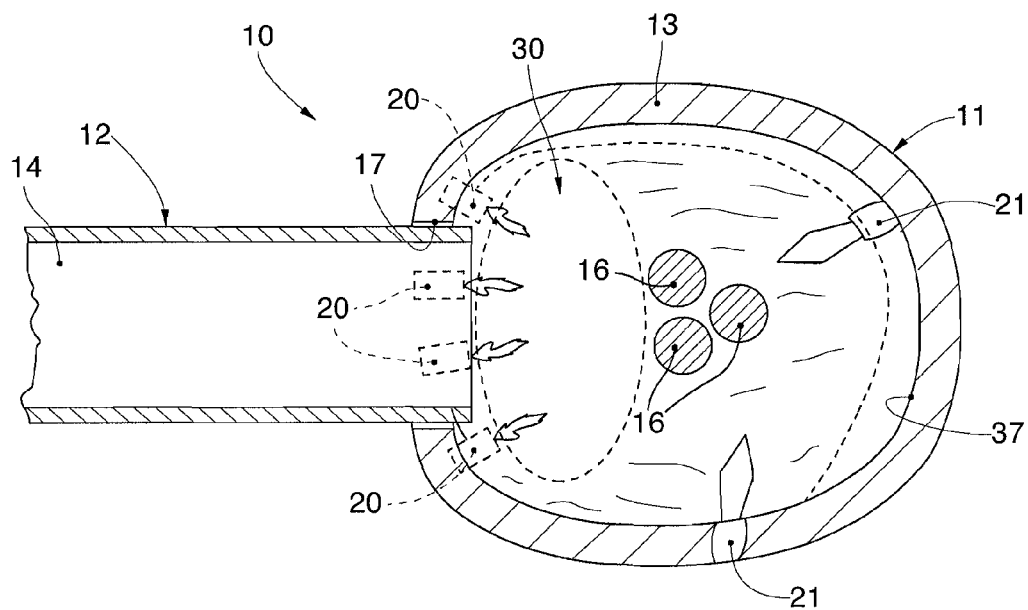
FIG. 4 is a plan schematic representation of FIG. 3.
Figure 5:
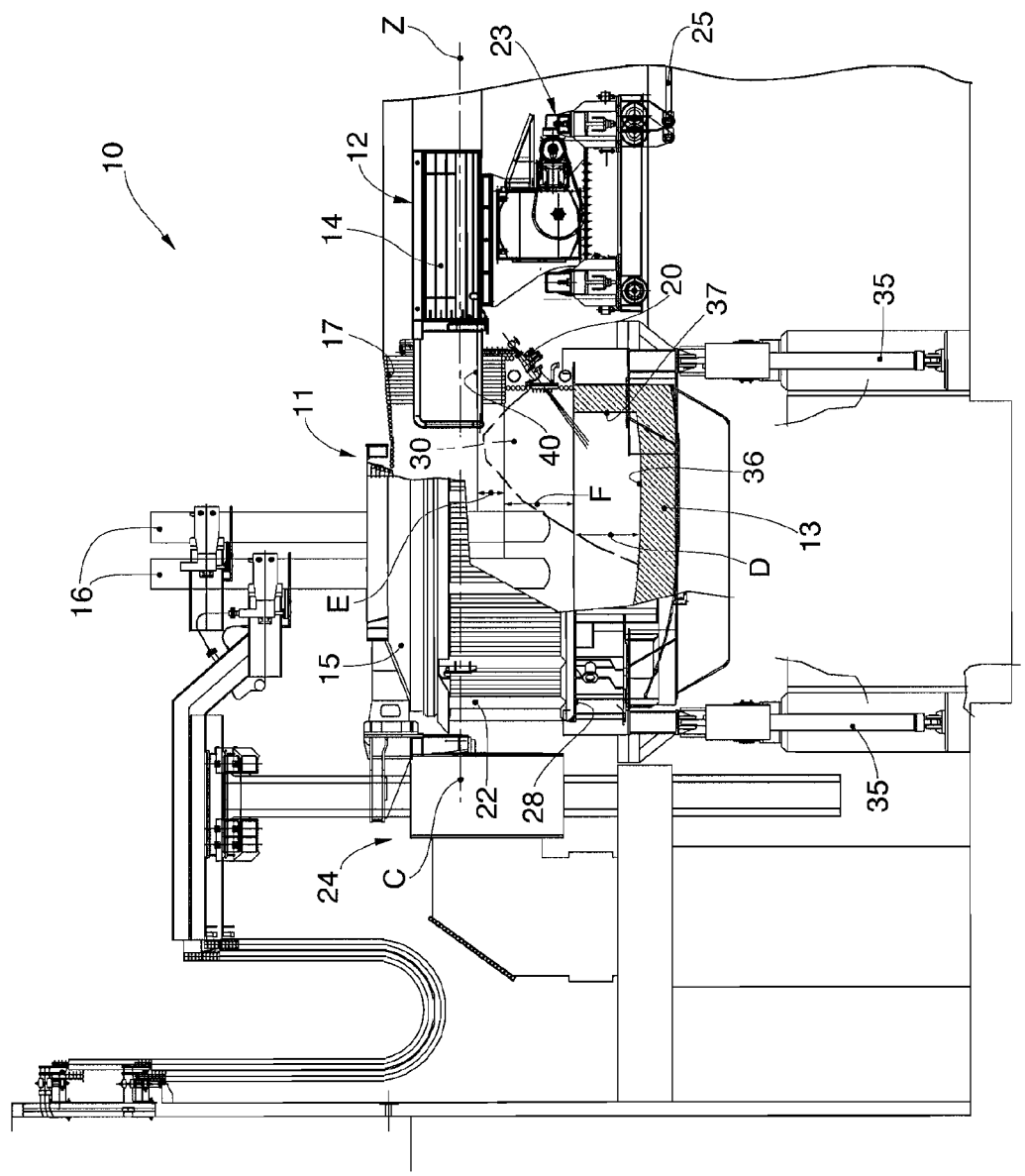
FIG. 5 is a part view of a plant that uses a method according to the present invention.

With reference to FIGS. 3-5, a melting plant for metal material is denoted in its entirety by the reference number 10 and comprises at least an electric arc furnace 11 which is served by feed means 12 to feed a metal charge, such as for example scrap S (FIG. 3), suitable to move the latter according to a determinate axis of feed Z.

The scrap S is loaded in a known manner onto the feed means 12, and has a determinate size that can even vary greatly.

The furnace 11 comprises, in its essential parts, a container or shell 13 and a roof 15 disposed above and to cover the shell 13.

Three holes are made in the roof 15, to house and/or position three electrodes 16, which are suitable to generate an electric arc in the metal charge present in the shell 13.

The roof 15 and the electrodes 16 (FIG. 5) are associated with lifting and rotation devices 24, which are suitable to lift the roof 15 and the electrodes 16, even independently of each other.

The shell 13 (FIG. 5) is provided with a bottom, or sole 36, and a lateral wall 37, also called upright, both made of refractory material so as to resist the high temperatures that are reached during the melting step, and the highly reactive environment.

The shell 13 has a depth D (FIG. 5) that determines the maximum quantity of liquid metal and possibly slag that can be contained inside it.

The shell 13 (FIG. 5) is mounted on supports (not visible in the drawings), and actuation means 28 are provided to rotate the shell 13 around a determinate axis of rotation C.

The axis of rotation C is disposed substantially aligned or in direct proximity with the axis of feed Z of the feed means 12.

The furnace 11 also comprises a panel 22 provided with a lower edge 28 disposed resting on the upper edge of the shell 13. The panel 22 develops substantially in progression with the walls of the shell 13 and above it the roof 15 is disposed, in order to close the shell 13.

The shell 13 and the panel 22, in proximity to their common connection edges, comprise sealing means, not visible in the drawings, conformed to prevent heat dispersions and/or leakages of the fumes.

The panel 22 is provided with an opening 17 through which the feed means 12 are positioned, to feed the scrap S.

During the normal functioning of the furnace 11, the feed means 12 are disposed with their discharge edge substantially flush with the wall of the panel 22 and the shell 13.

The height of the panel 22 is correlated to the entity of the opening 17, which in turn is sized according to the feed means 12 or the delivery of scrap S fed by the feed means 12. The conformation and disposition of the opening 17 in the panel 22 is also determined in relation to the movements to which the shell 13 will be subjected during the casting process.

More specifically, it is provided that the opening 17 is disposed so as to respect the condition of alignment or substantial alignment between the axis of rotation C of the shell 13 and the axis of feed Z of the feed means 12.

This condition allows to perform tapping of the molten metal, or slagging, without requiring that the feed means 12 be retracted. This reduces the process times since, as soon as the tapping is finished, it is possible to start the loading operations without having to wait for the electric arc to be switched on.

In particular, the opening 17 is made distanced with respect to the lower edge 28 of the panel 22 by a determinate height F which, in some embodiments, is comprised between 0.3 and 3 times the depth D of the shell 13, preferably between 0.5 and 2.5, more preferably between 0.5 and 1.5.

The portion of panel 22 comprised in the height F has the function of containing the scrap S loaded by the feed means 12, as will be described in more detail hereafter.

Heat exchange means, in this case exchangers with a bundle of tubes such as cooling panels, are associated with the panel 22 and the roof 15, to guarantee their mechanical resistance even at high temperatures.

In order to respect said condition of alignment between the axis of rotation C of the shell 13 and the axis of feed Z of the feed means 12, the feed means 12 are suitably conformed to allow the shell 13 to rotate, both during tapping and during slagging, preventing conditions of interference.

In particular, the feed means 12 (FIGS. 3-5) comprise a conveyor 14 of the vibration type that provides to move the scrap S forward toward the shell 13 with a determinate load Q, which selectively varies according to process parameters which will be described hereafter.

The conveyor 14 has a substantially trapezoid transfer section with a flat bottom 40 and the end from which it unloads the scrap S is disposed at a determinate distance E from the lower edge of the opening 17 (FIG. 5).

In other forms of embodiment, the bottom 40 can also be concave toward the surface containing the scrap S.

Furthermore, the terminal part of the conveyor 14 is mounted on a trolley served by vibration devices 23 (FIG. 5) and by a positioning device 25, only partly shown in the drawings.

The positioning device 25, in this case a hydraulic actuator, is suitable to move the trolley and with it the conveyor 14, from and to the opening 17 of the panel 22 in order to unload the scrap S into the shell 13.

Although the conveyor 14 can be translated in a horizontal direction to and from the furnace 11, it is always located at the same height with respect to the shell 13.

The conveyor 14, or possibly the vibration devices 23, are controlled by a control device 27 (FIG. 3), which is suitable to regulate the load Q of the scrap S that is conveyed to the shell 13 and introduced therein.

In other forms of embodiment, other types of feed means may be provided, such as for example conveyor belts.

Auxiliary energy supply means 20, in this case burners, are mounted in the panel 22, between its lower edge 28 and the lower edge of the opening 17, with the function of further supplying heat energy.

In particular the burners 20 (FIG. 4), four in this case, are associated with the panel 22 near the side where the scrap S is unloaded and are disposed substantially near the center line of the height F.

Oxygen injection means 21, or lances, are also provided in a known manner, suitable to inject oxygen into the bath of steel to allow to eliminate unwanted elements from the composition of the liquid.

The melting method according to the present invention provides a step of starting the plant 10 in which the feed means 12 load the furnace 11, distributing the scrap S uniformly on the bottom or sole of the shell 13.

The start-up step can also be performed with a basket as described in the state of the art. In this case, the roof 15 and the electrodes 16 are raised with respect to the shell 13 and displaced laterally to allow access for the basket.

Subsequently, (FIGS. 3 and 4), the roof 15 is used to close the shell 13, the electrodes 16 are positioned and inserted through the holes made in the roof 15, and the melting of the metal charge therein is started, to generate a determinate level of hot heel H (FIG. 3) of the molten metal which in this case is substantially equal to the level of the hot heel H that will be subsequently kept from tap-to-tap.

When the plant 10 has reached a normal working condition, between one tapping and the next, a level of hot heel H will be maintained inside the shell 13 which is comprised in a range between about 10% and 25% of the total quantity of liquid metal present before tapping.

Figure 1:
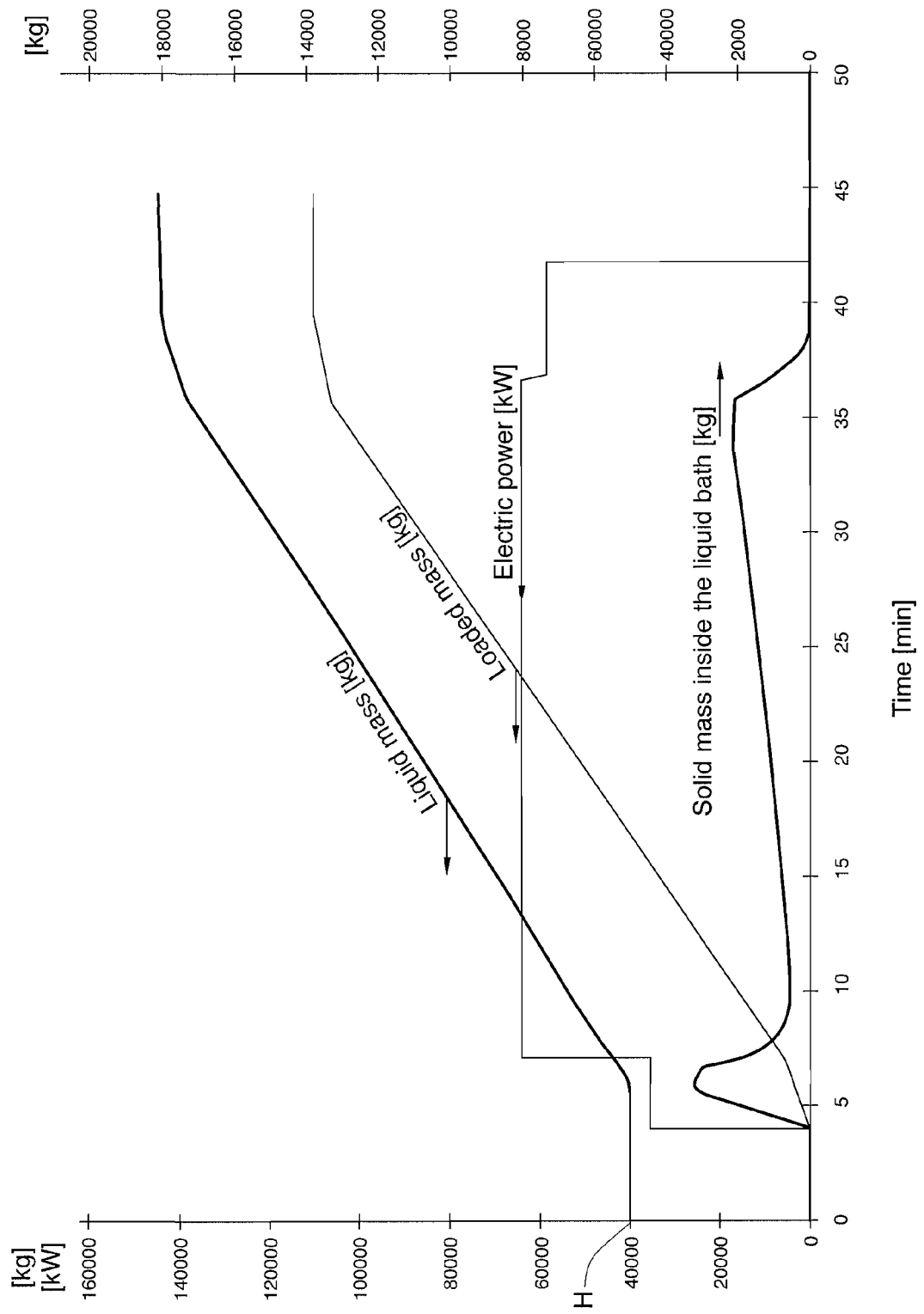
FIG. 1 is a graph showing the trend of the functioning parameters of a continuous loading melting furnace, using a state-of-the-art method as described above.
Figure 2:
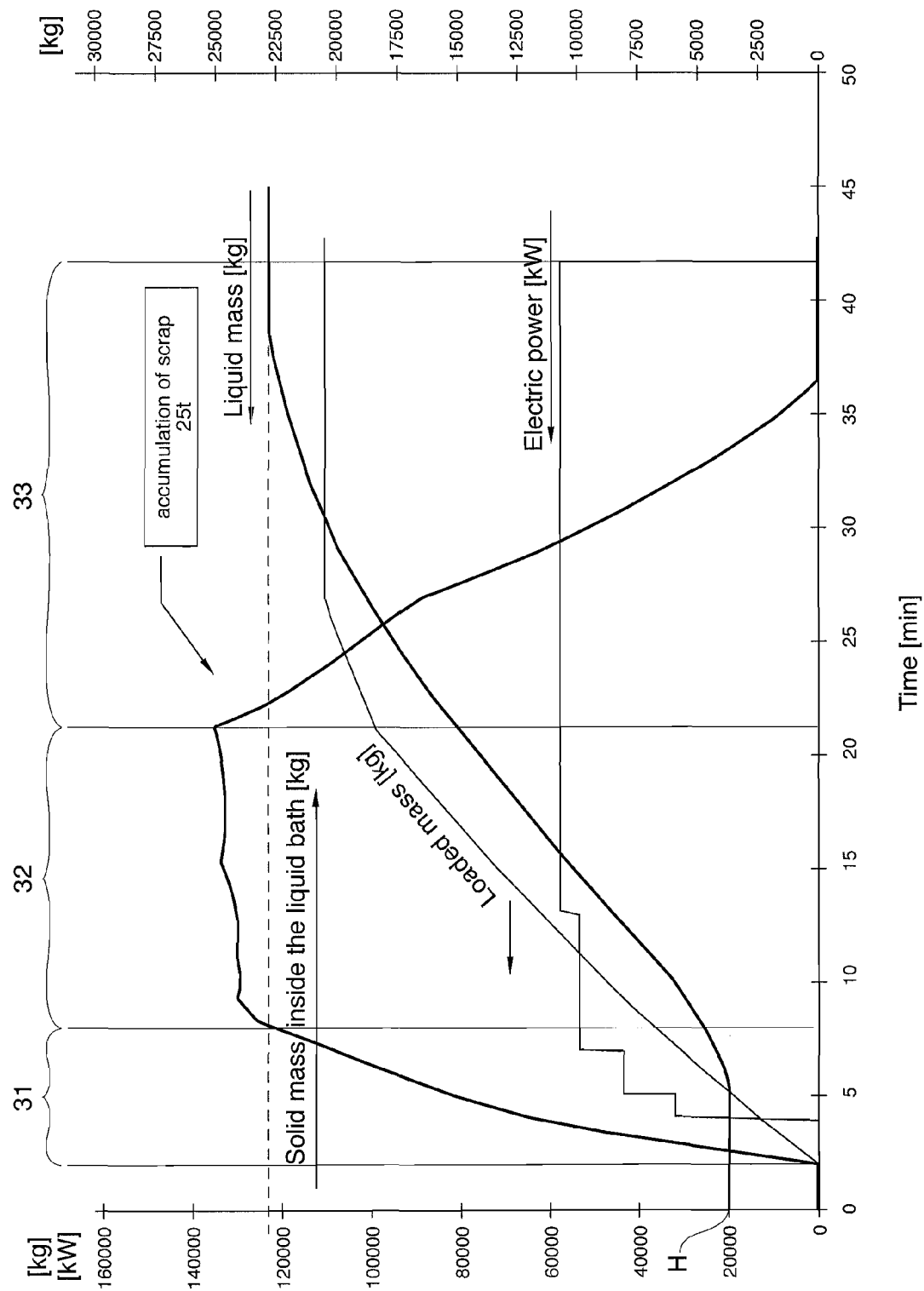
FIG. 2 is a graph showing the trend of the functioning parameters of a continuous loading melting furnace, using a method according to the present invention.

As can be seen by comparing the graphs showing the state of the art (FIG. 1), and the graphs obtained with the present invention (FIG. 2), given the same production capacity of the plant 10, in this case about 130 t/h, the level of hot heel H is substantially halved, thus giving improved productivity.

Following a tapping step of the molten metal, that is, immediately after the tapping step, the method provides a step of continuous loading of the scrap S, a simultaneous or at least partly simultaneous step of supplying electric power to the electrodes 16, power-on condition, and therefore a consequent step of melting the metal charge.

In the form of embodiment where the feed means 12 are configured to remain in the work position also during the tapping or slagging step, and as soon as one of these steps has come to an end, the feed means 12 can immediately re-start feeding the furnace 11, thus preceding the power-on condition.

To complete the melting of the metal charge, the supply of electric power is interrupted, in a power-off condition, and the tapping or casting step is provided.

During these steps, initially a first substep 31 is provided (FIG. 2), during which the scrap S (FIGS. 3 and 4) is loaded inside the shell 13 with a big load so as to generate, at least near the opening 17, an accumulation 30 of solid mass of scrap S.

The accumulation 30 defines a mass of solid material that is disposed at a height near that of the opening 17, that is, almost flush with the bottom 40 of the conveyor 14.

The first substep 31 provides that the feed means 12 supply the furnace 11 with a specific load of scrap comprised between about 50 (kg/min)/MW and about 150 (kg/min)/MW, preferably about 100 (kg/min)/MW.

Merely by way of example, in a furnace 11 with a nominal power of about 60 MW, the load Q of scrap S is comprised between about 3000 kg/min and about 9000 kg/min, preferably between 6000 kg/min and about 7000 kg/min.

The load Q of scrap S is maintained for about 10%-20%, preferably about 13%-17%, of the time comprised between power-on and power-off, in this case about 6 minutes.

The load Q of scrap S is regulated by the control device 27 associated with the conveyor 14.

At the same time as, during or after this first substep 31, the melting of the metal is also started—power-on condition. In the embodiment shown in FIG. 2, the melting of the metal is started with a delay of about 2 minutes from the first substep 31.

After the first substep 31, a second substep 32 is provided, during which the load Q of scrap is reduced, to allow the electrodes 16 to melt the metal, substantially in coordination with the quantity of scrap S that is introduced by the conveyor 14.

During the second substep 32, the load Q of scrap S is regulated so as to maintain in the liquid bath of steel a quantity of solid mass of scrap comprised between 25% and 45%, preferably between 30% and 40%, even more preferably between about 32% and about 38% of the overall quantity of liquid metal that will later be tapped.

The specific load of scrap S is kept substantially constant between about 75 (kg/min)/MW and about 85 (kg/min)/MW. Merely by way of example, in a furnace 11 with a nominal power of about 60 MW the load Q of scrap S is comprised between about 4500 kg/min and 5000 kg/min.

The balanced condition between the mass of scrap that is fed and the quantity of solid mass that is melted is maintained for a duration of about 10%-20%, preferably about 13%-17%, of the time comprised between power-on and power-off, in this case about 13 minutes.

The solid mass contained inside the liquid steel functions as a heat accumulator, also called "thermal flywheel", and allows to keep the steel already melted at a temperature lower than that it reaches in the state of the art.

Keeping the molten steel at a lower temperature allows to keep the bath in a condition of stability so as to reduce phenomena of wear on the walls of the shell, and hence to reduce the frequency of maintenance operations to restore them.

Subsequently, when a condition near to maximum load of the furnace is reached, during a third substep 33 (FIG. 2), the load Q of scrap is reduced, in this case initially halved, and is then substantially interrupted or in any case kept at a minimum level. In this way the whole solid mass present in the liquid is allowed to melt.

At the end of the third substep 33, the load is definitively stopped and all of the solid metal has passed to the liquid state.

During or after the third substep 33, a step of overheating the liquid steel is also provided, in a known manner, to determine the desired thermal and chemical characteristics of the bath of molten metal.

Between and/or during the first 31 and third 33 substep, it is also provided to supply auxiliary heat energy, by means of the burners 20.

Since they are associated with the panel 22, in proximity to the accumulation 30 of scrap S, the burners 20 heat the scrap S directly, with a direct flame.

Furthermore, the accumulation 30 of scrap S, at least during the second substep 32, has a substantially constant height and therefore functions as a barrier against possible splashes, or against the high temperatures of the liquid metal, allowing both to increase the working life and also to bring the burners 20 nearer to the solid accumulation mass 30; all this gives the advantage respectively of a reduction in the maintenance times required for, and efficiency of, the burners 20.

During the second and third step, operations to inject oxygen are provided with the functions as described above, operations to supply carbon to moderate the production of iron oxide, and operations to supply lime and magnesite to modify the composition of the slag and enable the dephosphorization process.

Furthermore, at least during the second and third step, additives are added to promote the increase in volume of the slag, also known as slag foaming, which has the effect of protecting the bath of metal from oxidation, and also shielding the heat irradiation energy generated by the molten bath and the electric arcs of the electrodes 16.

At the end of the third step, the supply of electric power is interrupted, power-off condition, there is a step of tapping the molten steel by means of inclination, also known as tilting, of the shell 13.

The tapping step provides to rotate the shell 13 until the determinate level of hot heel H, as identified above, is left inside it.

Depending on the process to be carried out, it is also possible to effect a removal of the slag, also known as slagging, before or during the tapping step, by rotating the shell 13 in the opposite direction to the tapping step. On the contrary, if the shell 13 is not rotated for slagging, but is inclined on the opposite side in order to keep the slag inside the shell 13, the furnace 11 according to the present invention allows to keep a larger volume of slag, in that it does not overflow from the opening 17 used for loading scrap S.

Once the tapping operation is ended, the tapping hole is closed and the shell 13 is returned, by rotation, to its normal position.

During this last operation, given that the conveyor 14 remains in its position inside the shell 13, it is possible to already start loading the scrap S, therefore immediately after the tapping operation. This allows to greatly reduce downtimes, and to carry out a killing action on the steel of the hot heel.

It is clear that modifications and/or additions of parts may be made to the method for melting metal material as described heretofore, without departing from the field and scope of the present invention.

It is also clear that, although the present invention has been described with reference to some specific examples, a person of skill in the art shall certainly be able to achieve many other equivalent forms of method for melting metal material, having the characteristics as set forth in the claims and hence all coming within the field of protection defined thereby.

The invention claimed is:

1. A method for loading and melting metal material in a melting plant comprising an electric furnace having a shell into which said metal material is introduced, and feed means to load said metal material into said shell, said loading and melting method comprising:
loading said metal material into said shell by means of said feed means,
melting said metal material, and then
tapping the molten metal material,
wherein said loading comprises a first loading substep in which said metal material is loaded inside said shell to generate an initial accumulation of solid metal material inside said shell equal to between 25% and 45% of the overall quantity of molten material contained inside the electric furnace before the tapping and which will be tapped at the end of the melting cycle,
wherein the melting comprises melting a first quantity of said metal material loaded inside said shell during the first substep, and wherein said loading further comprises a second loading substep, performed subsequent to the first substep, in which the load with which said metal material is unloaded into the shell is reduced by a control device in such a way that the load of metal material that is charged into the electric furnace in said second loading substep corresponds to the first quantity of metal material that is melted, so as to maintain, inside a metal bath that is gradually formed, a quantity of solid metal material that is equal to the quantity of solid metal material that defines said initial accumulation, and
wherein said loading further comprises a third loading substep in which the feed load is further reduced until the loading process is stopped, to allow all the metal material present in the furnace to be completely melted, wherein the tapping step takes place when the whole solid mass has melted.

2. The method of claim 1, wherein at least between and/or during said first loading substep and second loading substep an auxiliary heat energy supply is provided by combustion-type auxiliary heating energy supply means.

3. The method of claim 2, wherein said auxiliary heating energy supply means are disposed in proximity to said accumulation of solid material in order to heat the latter.

4. The method of claim 1, wherein said quantity of metal material that defines the accumulation comprises between 30% and 40% of the overall quantity of liquid metal that is tapped.

5. The method of claim 4, wherein said quantity of metal material that defines the accumulation comprises between 32% and 38% of the overall quantity of liquid metal that is tapped.

6. The method of claim 1, wherein the load in said first loading substep comprises between about 50 (kg/min)/MW and about 150 (kg/min)/MW.

7. The method of claim 6, wherein the load in said first loading substep comprises about 100 (kg/min)/MW.

8. The method of claim 1, wherein the load in said second loading substep is constant and comprises between 75 (kg/min)/MW and about 85 (kg/min)/MW.

9. The method of claim 1, wherein said step of loading said metal material into said shell occurs immediately after said tapping step.

10. The method of claim 1, including disposing said feed means at the side and above said shell, and disposing the mass of said metal material of the accumulation so that the mass of said metal material moves to a height near the feed height of said feed means.

11. The method of claim 1, wherein during said tapping step said molten material is taken from said shell leaving inside the shell a determinate level of liquid material for a subsequent melting step, wherein the quantity of liquid material defining said level comprises between 10% and 25% of the overall quantity of liquid metal.

12. The method of claim 1, wherein the tapping comprises rotating the shell until a level of the melted metal material in the furnace is equal to between 10% and 25% of the total quantity of melted metal material in the furnace prior to the tapping, and wherein the level of the melted metal material in the furnace is maintained following the tapping.

13. The method of claim 1, wherein the feed means comprises a conveyor that is movable in a horizontal direction toward and away from the electric furnace.

14. A method for loading and melting metal material in a melting plant comprising an electric furnace having a shell into which said metal material is introduced, and feed means to load said metal material into said shell, said loading and melting method comprising:

loading said metal material into said shell by means of said feed means, melting said metal material, and then tapping the molten metal material, wherein said loading comprises a first loading substep in which said metal material is loaded inside said shell to generate an initial accumulation of solid metal material inside said shell equal to between 25% and 45% of the overall quantity of molten material contained inside the electric furnace before the tapping and which will be tapped at the end of the melting cycle, wherein the melting comprises melting a first quantity of said metal material loaded inside said shell during the first substep, and wherein said loading further comprises a second loading substep, performed subsequent to the first substep, in which the load with which said metal material is unloaded into the shell is reduced by a control device in such a way that the load of metal material that is charged into the electric furnace in said second loading substep corresponds to the first quantity of metal material that is melted, so as to maintain, inside a metal bath that is gradually formed, a quantity of solid metal material that is equal to the quantity of solid metal material that defines said initial accumulation, wherein said loading further comprises a third loading substep in which the feed load is further reduced until the loading process is stopped, to allow all the metal material present in the furnace to be completely melted, wherein the tapping step takes place when the whole solid mass has melted, and wherein the tapping comprises maintaining a level of the melted metal material in the furnace equal to between 10% and 25% of the total quantity of melted metal material in the furnace prior to the tapping.

15. The method of claim 14, wherein the tapping further comprises rotating the shell until the level of the melted metal material in the furnace is equal to between 10% and 25% of the total quantity of melted metal material in the furnace prior to the tapping.

16. The method of claim 14, wherein the feed means comprises a conveyor that is movable in a horizontal direction toward and away from the electric furnace.

* * * * *